US012125462B1

(12) United States Patent
Chown

(10) Patent No.: US 12,125,462 B1
(45) Date of Patent: Oct. 22, 2024

(54) DRUM

(71) Applicant: Daniel Chown, Reno, NV (US)

(72) Inventor: Daniel Chown, Reno, NV (US)

( * ) Notice: Subject to any disclaimer, the term of this patent is extended or adjusted under 35 U.S.C. 154(b) by 364 days.

(21) Appl. No.: 17/866,704

(22) Filed: Jul. 18, 2022

(51) Int. Cl.
*G10D 13/02* (2020.01)
*G10D 13/16* (2020.01)

(52) U.S. Cl.
CPC ............ *G10D 13/02* (2013.01); *G10D 13/16* (2020.02)

(58) Field of Classification Search
CPC ......... G10D 13/02; G10D 13/16; G10D 13/00
See application file for complete search history.

(56) References Cited

U.S. PATENT DOCUMENTS 10,529,307 B1 * 1/2020 Chen ...................... G10D 13/20

* cited by examiner

*Primary Examiner* — Kimberly R Lockett

(57) ABSTRACT

A drum has an attachment assembly for tensioning one or more drum heads, and for mounting drum peripherals without piercing the drum shell. The attachment assembly tensions the drum heads to the shell by use of a separate, circumferential tension hoop and gasket-like “isolators” that isolate the tension hoop from drum-shell vibrations. This assembly reduces tonal alterations inherent in drum designs of the art, in which components are rigidly fastened to the drum shell. Rather than using common tension rods and lugs, this attachment assembly enables tuning/tensioning via the tension hoop. The tension hoop obviates the use of multiple lugs and hardware that commonly pierce a drum shell and preserves a continuous and homogeneous resonant drum shell. The tension hoop also enables differing top- and bottom-head tensions.

17 Claims, 8 Drawing Sheets

DRUM

TECHNICAL FIELD

The invention relates in general to drums and more specifically to drum construction.

BACKGROUND

A drum is a musical device used to produce a percussive, resonant sound which gives rhythm, melody, and punctuation to music. A typical drum is constructed of a cylindrical shell (typically wood or metal), with two thin membranes stretched over each end. Each membrane is tuned (or "tensioned") to resonate and compliment the other. The drum shell, top and bottom hoops, and all other parts resonate to produce the composite sound of the drum. Materials used for drum shells determine the drum's sound characteristics. The resonance of the shell itself is considered an important part of the drum tone.

Typical drum construction involves a drum shell with one or more drum heads which are attached and tensioned to the shell using a circumferential drum hoop and a series of fixed tension rods and lugs. Drum-mounted hardware such as lugs are attached with fasteners that typically pierce the drum shell. Tension rods attach to lugs, and lugs are typically bolted to the drum shell. Current manufacturing techniques use one lug for each tension rod and 1-3 fasteners per lug.

A drum support structure is an apparatus for supporting the drum on at least one leg, bracket, or stand, or for supporting ancillary drum components such as a snare strainers, kick pedals, percussion instruments (such as cowbells), cymbals, or recording/performance equipment (microphones).

Snare wire-tensioning systems and lugs are typically bolted to a drum shell [note tension rods are parallel to the drum axis and don't go through the shell (just into the lug)]. Other attachments (e.g., snare strainers, legs, feet), are typically attached to hardware that is bolted to the drum shell.

Any mounting hardware adds mass to a drum shell. Mass is a primary variable influencing the shell's resonant frequencies and damping characteristics. Minimizing mass additions to the drum shell ensures minimal alteration of the innate drum-shell tone. Drum-mounting hardware requires holes to be drilled into the drum shell. The holes interfere with the drum's desired resonance quality. Piercing the shell is an undesirable but commonly accepted practice in drum-making. To ensure that the drum projects the desirable shell tone, it is considered ideal to have minimal holes added to the shells for bolting on subsequent hardware, and minimal mass added since mass is a primary variable influencing the shell's resonant frequencies and damping characteristics.

The current state of the art offers drum designs in which top and bottom drum heads can be independently tensioned/tuned, but these designs pierce the drum shell. Some designs tighten drum hoops to themselves, but do not enable differing top- and bottom-head tensions.

The current state of the art offers other tensioning mechanisms that don't pierce the drum shell, but they fail to offer differing top and bottom tensions.

Some advances in the state of the art show "free floating" drum shell designs that enable differing top- and bottom-head These designs add an interface between the bearing edge (the circumferential edges at the top and bottom of the shell which contact the drum head) and the rest of the drum shell or structure. This alters and impedes resonance because the structure between the top and bottom heads is discontinuous.

In some innovations, sets of tuning lugs maintain the desired feature of differing top- and bottom-head tensions. However their drum lugs add unwanted mass to a drum shell, and alter the tone of the drum shell. Typical lugs rigidly couple the shell to the drum hoop in both axial and radial directions, further restricting shell resonance.

Without the use of rigidly attached, traditional drum lugs that pierce the drum shell, no designs in the state of the art enable strike energy on the drum-head to transmit unimpeded to the drum shell while at the same time enabling differing top and bottom tensions.

SUMMARY

A drum has an attachment assembly for tensioning one or more drum heads, and for mounting drum peripherals, without piercing the drum shell. The attachment assembly tensions one or more drum heads to the shell by use of a separate, circumferential tension hoop along with gasket-like "isolators" that isolate the tension hoop from drum-shell vibrations. This assembly reduces tonal alterations inherent in drum designs in the art, in which components are rigidly fastened to the drum shell. Rather than using common tension rods and lugs, this attachment assembly enables tuning/tensioning via the tension hoop. The tension hoop obviates the use of multiple lugs and hardware that commonly pierce the drum shell, preserving a continuous and homogeneous resonant drum shell. The tension hoop also enables differing top- and bottom-head tensions A drum hoop is affixed to a tension hoop by bolts which are used to tighten the tension hoop, effectively adjusting the drum head's tension on the shell. During tensioning, as the drum hoop is forced toward the tension hoop, blocking protrusions (referred to as "interlocks") on the outer surface of the drum shell stop the tension hoop from moving axially.

In some embodiments, interlocks are integral to the drum shell. They may be welded to a metal drum shell or integrated into the lamination process that is commonly used in making a wood drum shell (or similarly in the process of making a fiber-reinforced polymer or plastic shell).

Isolators are damping fittings that reside between the tension hoop and the interlocks. In combination, the interlocks and isolators support the tension hoop. In this embodiment, no hardware pierces the drum shell; all attachments to the drum shell are made with the tension hoop. Both the tension hoop and the drum hoop are separated from the drum shell by the isolator, which, in combination with the tension hoop and interlocks, obviates the need for hardware that rigidly couples the drum hoop, tension rods and tension ring to the drum shell. An annular gap in the isolator further separates the tension hoop and drum hoop from the drum shell. Strike force applied to the drum skin or resonant membrane is transferred only to the drum shell.

In an iteration, interlocks comprise a first mounting bracket on the inner surface of a drum shell and a second mounting bracket on the outer surface, with a fastener passing through the drum shell to affix the first and second mounting brackets against the drum shell. Although this iteration involves piercing the drum shell, far fewer fasteners are required to support both batter-side drum head and resonant-side drum head than in common drum assemblies. A tension hoop can react to axial forces produced by the tensioning of the drum skin while allowing micromotions created by shell resonance in the isolator interface. Because it is coupled to the drum shell with minimal piercing and minimal mass, it does not alter the resonant tone of the drum; striking force is efficiently transmitted to the drum shell.

In this iteration, the tension hoop may be supported by three interlocks that require three through-holes. An isolating gasket separates the tension hoop from drum-shell vibrations. Hardware (e.g., mounts, feet, snare-wire mechanisms, cymbal mounts or percussion mounts) is mounted to the tension hoop rather than to the drum shell. During head swapping, tension hoops stay in place along with the interlock mechanism. One skilled in the art understands that a tension hoop may be affixed to the interlocks by way of clasps, clamps, mechanical joints or fasteners, so that it remains in place when swapping a head.

In some embodiments, hardware (mounts, feet, snare-wire mechanisms, auxiliary cymbal mounts or percussion mounts) is mounted to the tension hoop rather than to the drum shell.

In all embodiments, the drum construction enables differing top- and bottom-head tunings.

Other objects and features will become apparent from the following detailed description considered in conjunction with the accompanying drawings. It is to be understood, however, that the drawings are designed as an illustration and not as a definition of the limits of the invention.

BRIEF DESCRIPTION OF THE DRAWINGS

To assist those of skill in the art in making and using the disclosed invention and associated methods, reference is made to the accompanying figures, wherein.

DESCRIPTION

Figure 1:
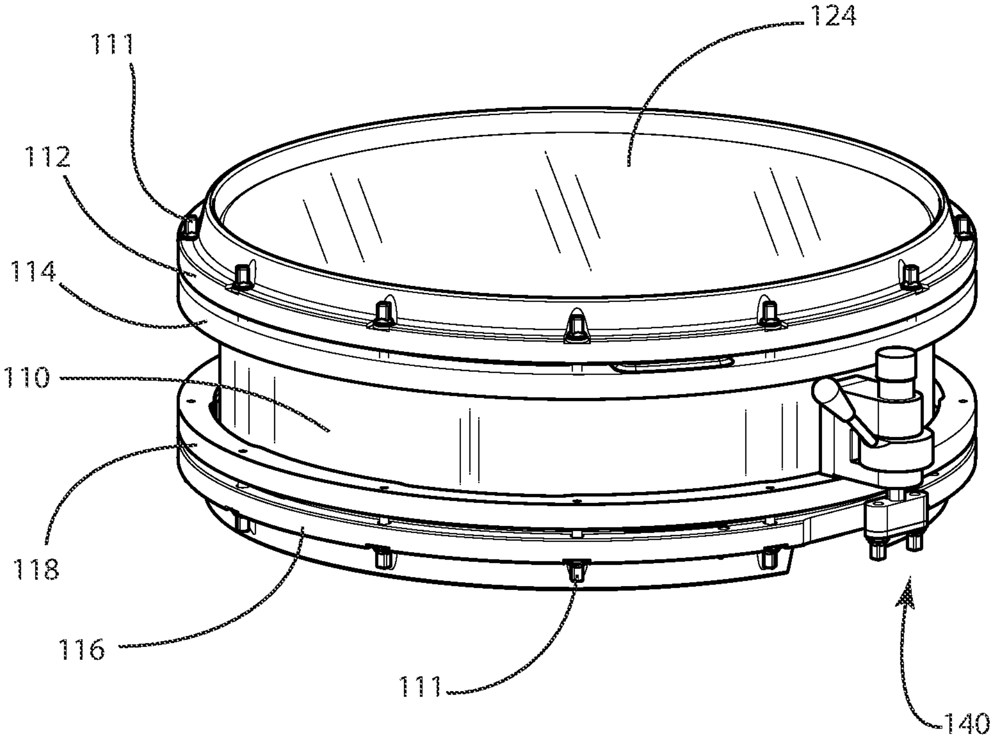
FIG. 1 is a front perspective view of an example embodiment.
Figure 2:
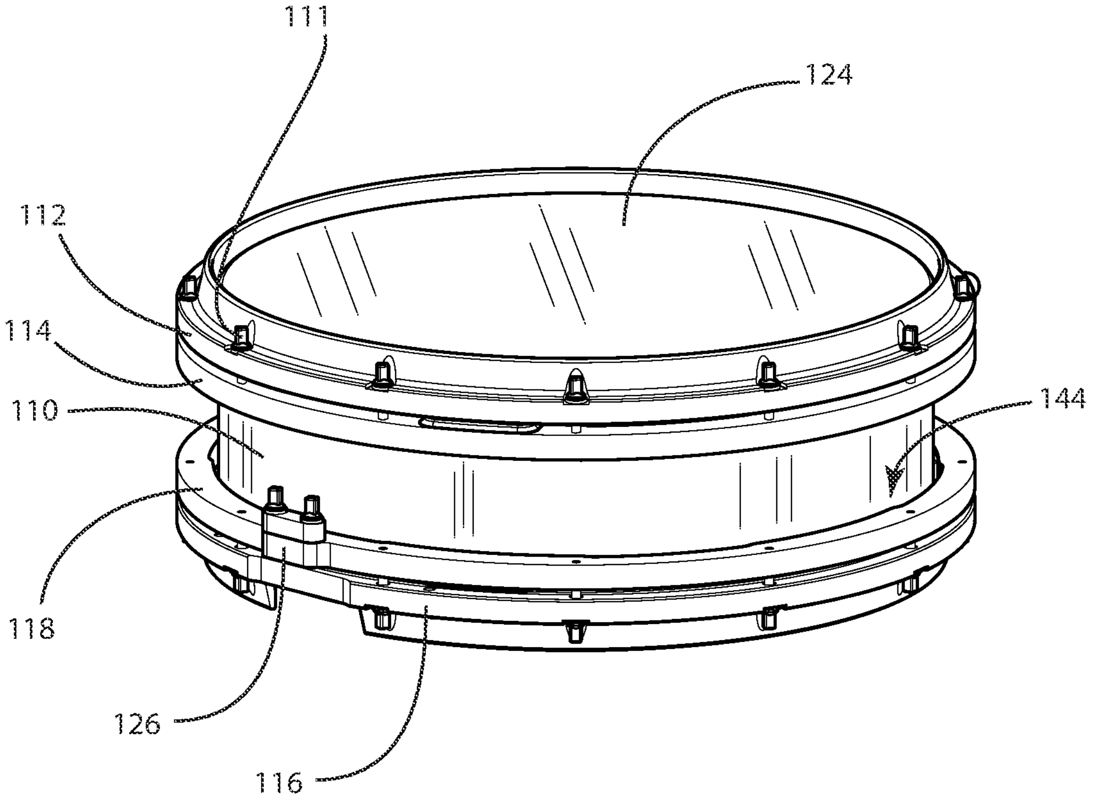
FIG. 2 is a rear perspective view.

FIGS. 1-4 depict an example embodiment 100 configured to fit a snare drum. On the batter side, the drum hoop 112 interfaces with the circumference of the batter skin 124 in a common arrangement. The drum hoop 112 is tensioned to a tension hoop 114 with common tension rod hardware 111. The common tension rod hardware 111 consists of threaded bolts that, when tightened, force the drum hoop 112 toward the tension hoop 114, tensioning the batter-side drum head. The tension hoop 114 rests against interlocks 130. Interlocks are protrusions that stop the tension hoop from moving axially (FIG. 3, 108) as the drum hoop is forced toward the tension hoop when tightened by bolts 111.

Isolators are gasket-like objects that allow relative motion and vibration between the tension hoop and the resonating drum shell. In combination, the protrusions and isolators support the tension hoop while allowing vibrations between the tension hoop and the drum shell. The tension hoop 114 is supported by the interlocks 130 which are integral to the drum shell and do not require fasteners; in this way they obviate piercing of the drum shell 110.

A gasket (isolator) 138 between the interlock 130 and the batter-side tension hoop 114 isolates the tension hoop from the drum shell, mitigating unwanted vibration. An annular gap 145 in each isolator further separates the tension hoop and drum hoop from the drum shell. The drum hoop, tension hoop, and adhering interlocks comprise a drum-head tensioning system that couples with the drum shell with minimal contact. One skilled in the art understands that because the batter-side drum hoop 112 and tension hoop 114 are isolated from the drum shell, the striking force on drum head 124 is transferred only to the drum shell 110, mitigating unwanted tonal effects. One skilled in the art understands that a gasket may be constructed of a wide range of materials of various durometers or hardnesses?.

In some embodiments, such as those used with metal-sided drum shells, interlocks are welded to the shell. In other embodiments, such as those used with wood or fiber-reinforced polymer drum shells, interlocks are formed in the shell's lamination process. Tension hoops contact isolators that are affixed to interlocks which are affixed to the drum shell with a no fasteners or a minimum number of fasteners.

The resonant side of the drum is configured the same way (do we specify somewhere that the resonant side is the non-strike side?); a resonant-side drum head 123 is affixed to a resonant-side drum hoop 116. A resonant-side tension hoop 118 joins with a drum hoop 112 with common lugged hardware 111. The resonant-side tension hoop 118 and resonant-side drum hoop 116 are similarly isolated from the drum shell.

Both the batter-side drum hoop 112 and the resonant-side drum hoop 116 may be independently adjusted against their respective tension hoops 114/118.

Figure 3:
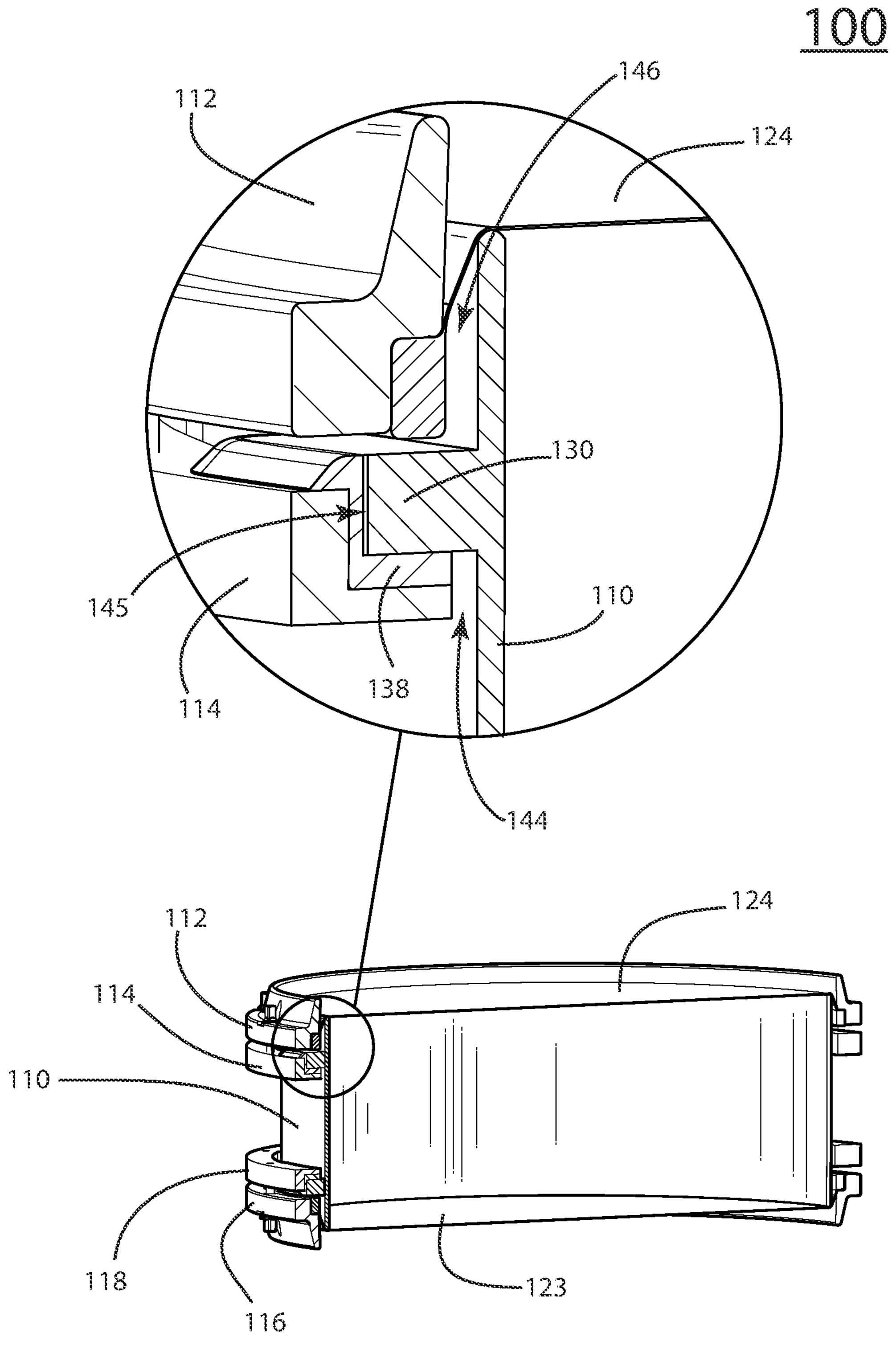
FIG. 3 shows a perspective, section view and a detail view.
Figure 4:
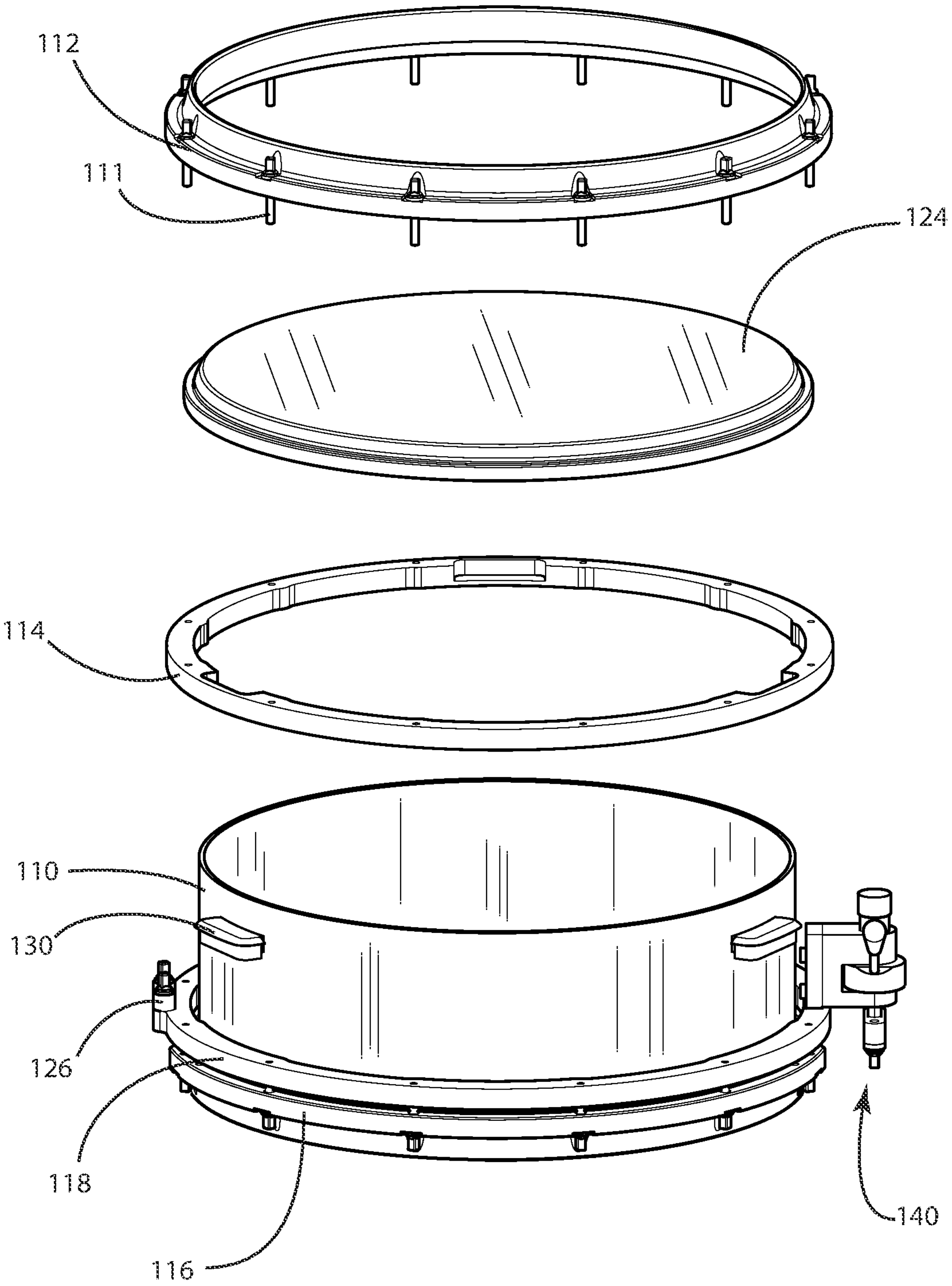
FIG. 4 is a perspective, exploded view.

In FIG. 3 a gap 144 can be seen between the tension hoop 114 and the drum shell 110. This shows how the tension hoop is isolated and not rigidly coupled to the drum structure. Similarly, a gap 146 exists between the drum hoop 112 and the drum shell 110, as is common in the art.

A snare strainer 140 (FIG. 4) is affixed to the resonant-side tension hoop 118. Tension hoops 118/114 are of sufficient structure to support various components commonly attached to drums, including legs and support structures. The elastomeric isolator 138 (FIG. 3) separates the drum shell from extraneous vibrations or interference from components commonly attached to drums. One skilled in the art understands that hardware that pierces a drum shell reduces the performance of the drum. The tension hoops 114 and 118 provide the required structure to hold snare strainers and all other hardware without piercing the shell or rigidly coupling additional mass to the drum structure.

Figure 5:
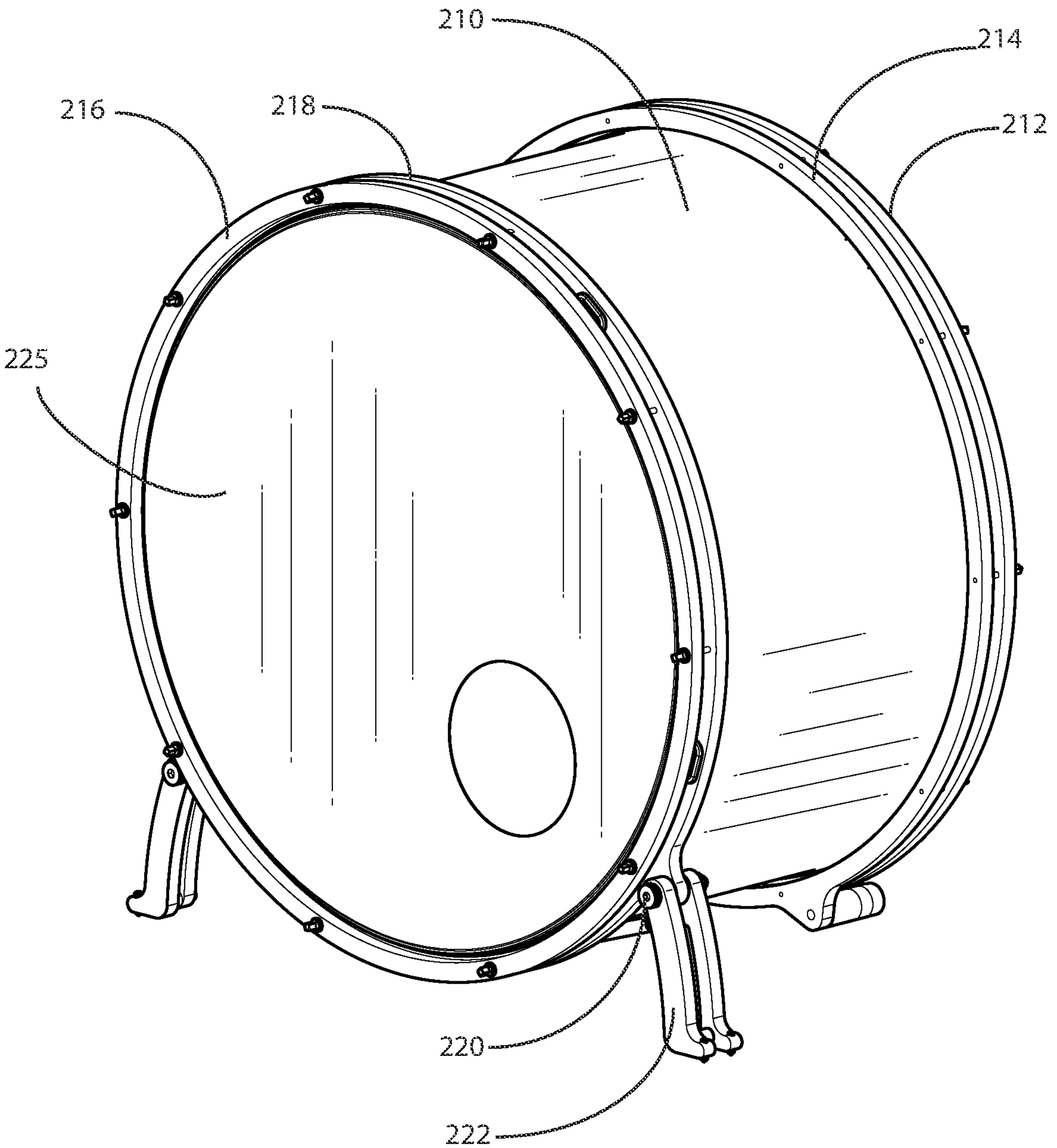
FIG. 5 is a front-perspective view of an iteration of the embodiment.
Figure 6:
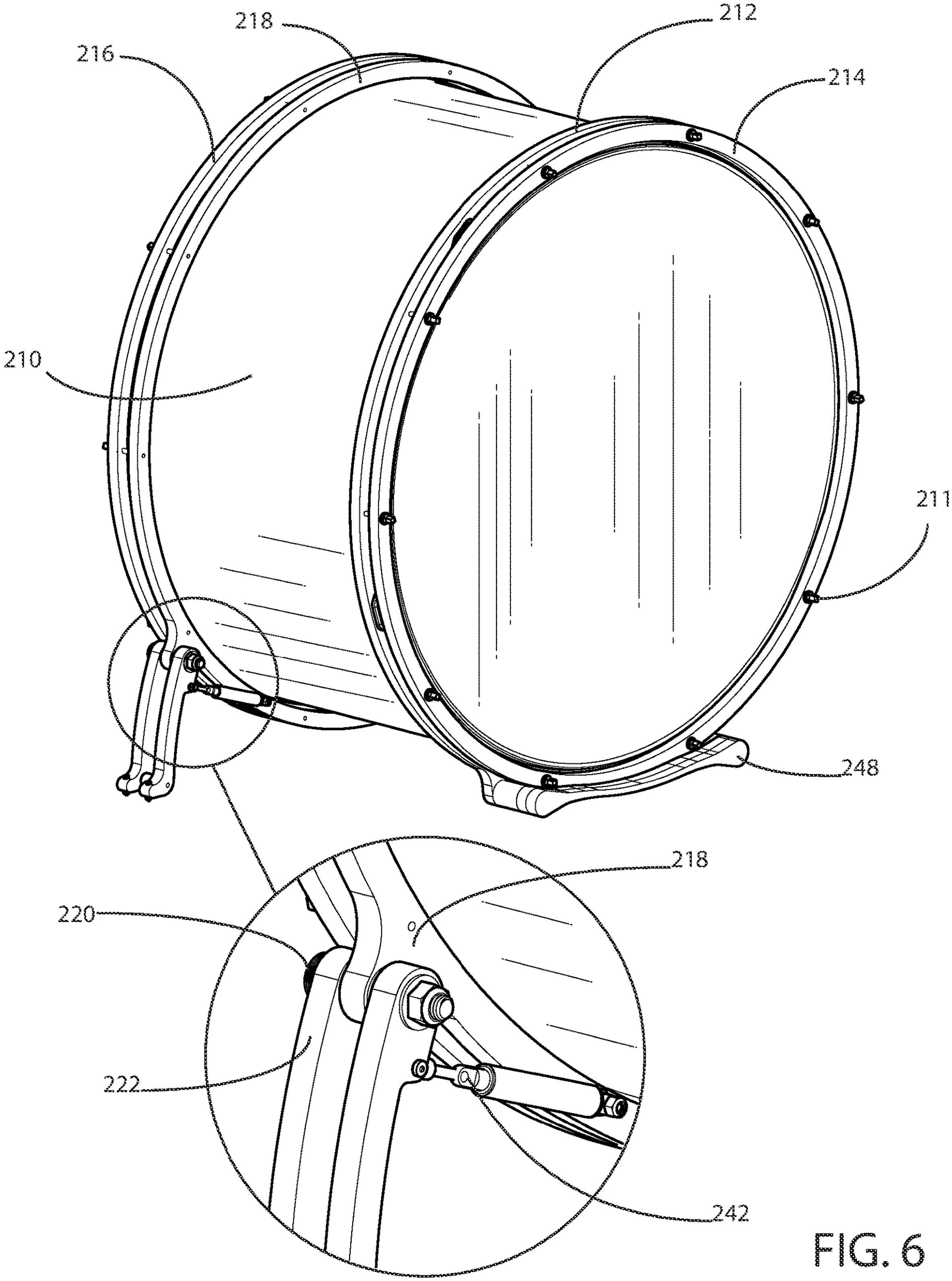
FIG. 6 is a rear-perspective, detailed view thereof.

FIGS. 5-6 depict an example embodiment 200 configured to fit a bass drum. One skilled in the art understands how an apparatus that fastens a batter-side drum head and a resonant-side drum head on a snare drum may be used to fasten the same on a bass drum. Similar interlocks are part of the bass drum shell 210. The bass-drum configuration has a similar batter-side tension hoop 214 and batter-side drum hoop 212 that is joined to the batter-side tension hoop 214 to support a batter-side drum head 224 (FIG. 6). A similar, resonant-side tension hoop 218 and resonant-side drum hoop 215 support a resonant-side drum head 225. The tension hoop 214 is joined to drum hoops 212 with common lugged hardware 211.

A resonant-side tension hoop 218 is similarly mounted, joined with a drum hoop 212 with common lugged hardware 211. The resonant-side tension hoop 218 and resonant-side drum hoop 216 are similarly isolated from the drum shell.

The drum-head tensioning mechanism has minimal contact with the drum shell. One skilled in the art understands that the striking force on a batter-side drum head 224 is transferred to the drum shell 210 through drum head 225, drum hoop 216 and tension hoop 218 before reacting through the spurs or feet 220 and 222. Similar to the snare strainer 140, the tension hoop 218 can support spurs or feet. This allows them to be removed from the drum shell, reducing mass that is rigidly coupled to the drum shell, and reducing alteration of the drum shell's natural resonance.

The batter-side drum hoop 212 and the resonant-side drum hoop 216 may each be independently adjusted against their respective tension hoops 214/218.

Legs 222 (FIG. 6) are affixed to the resonant-side tension hoop 218. A kick pedal mount 248 is affixed to the batter-side tension hoop 212. Tension hoops 218/214 are of sufficient structure to support various components commonly attached to drums, such as legs and support structures. In some embodiments a gas spring 242 is affixed about a pivot to the legs 222 and to the resonant-side tension hoop 218. The legs 222 pivot about hardware 220, in an arrangement that allows them to be both held open and closed without fasteners. In other embodiments traditional bass drum legs or spurs provided by others can be fastened to the tension ring.

Figure 7:
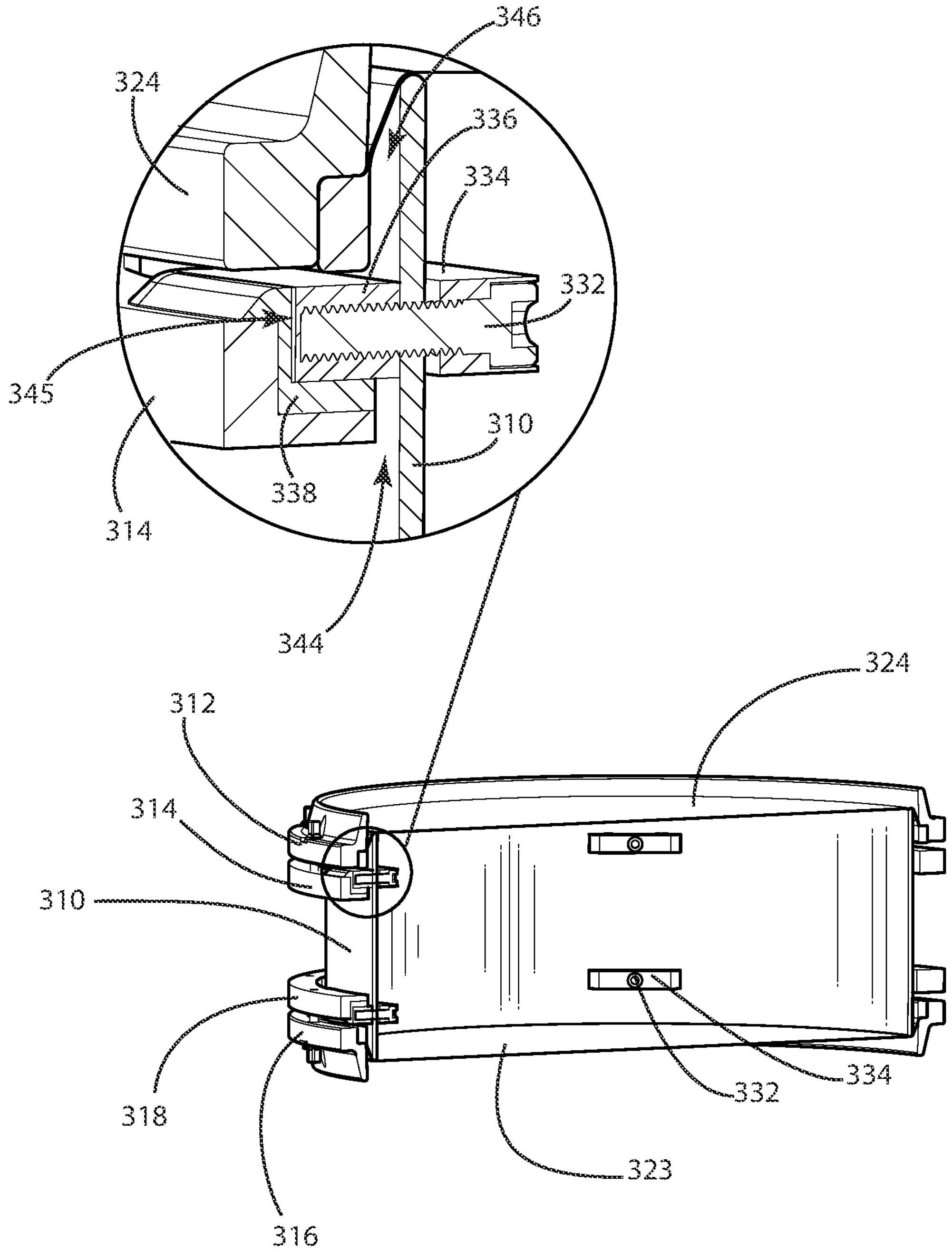
FIG. 7 is a perspective, section view and a detail view of an iteration of the embodiment.
Figure 8:
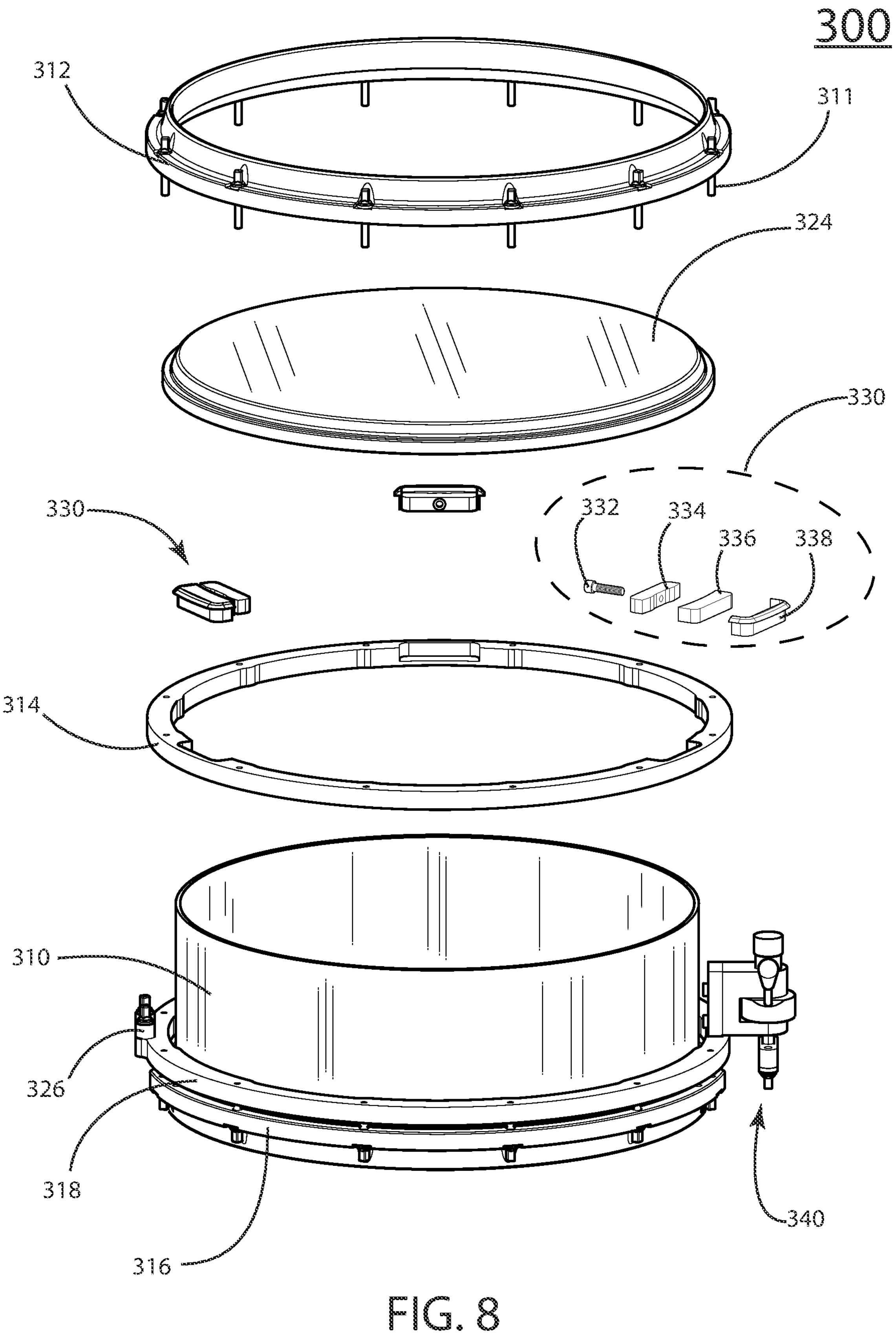
FIG. 8 is an exploded view thereof.

FIGS. 7-8 depict a third iteration 300 configured to fit a snare drum. A drum shell 310 has interlock hardware assemblies 330 (FIG. 8) affixed to the shell. An interior mounting bracket 334 is fastened to an exterior mounting bracket 336 with a fastener 332 that passes through the drum shell 310. An elastomeric gasket 338 resides between the exterior mounting bracket 336 and a batter-side tension hoop 314. The tension hoop 314 is joined to a drum hoop 312 with common lugged hardware. The batter-side drum hoop 312 is affixed to the batter drum head 324. One skilled in the art is familiar with methods and apparatuses that tighten a drum head 324 to a drum hoop 312.

Drum hoops 312/316 are affixed to the drum head 324, which is in contact with the bearing edge of the drum shell. A gap 346 resides between the drum hoop 312 and the drum shell 310. Drum hoops 312/316 do not touch the drum shell 310 directly. Tension hoops 314/318 contact isolators 338 that are affixed to interlocks 330 which are affixed to the drum shell 110 with a minimum number of fasteners. A gap 344 resides between the tension hoop 314 and the drum shell 310. Tension hoops 314/318 do not touch the drum shell 310 directly. An annular gap 345 in each isolator further separates the tension hoop and drum hoop from the drum shell.

snare strainer 340 (FIG. 8) is affixed to the resonant-side tension hoop 318.

A resonant-side tension hoop 318 is similarly mounted by way of interlock hardware assemblies 330 on the resonant side of the drum. Tension hoops 318/314 are of sufficient structure to support various components commonly attached to drums, such as legs and support structures.

The elastomeric gasket 338 isolates the drum shell from extraneous vibrations or interference from components commonly attached to drums. Interlock hardware assemblies 330 support tension hoops 314/318 such that most of the drum shell's 310 surface is uninterrupted. One skilled in the art understands that hardware that pierces a drum shell negatively affects the resonant qualities of a drum A resonant-side drum head 323 affixes to a resonant-side drum hoop 316. The drum-head tensioning mechanism has minimal contact with the drum shell. One skilled in the art understands that the striking force on a batter-side drum head 324 is transferred to the drum shell 310 without transferring to the isolated batter-side tension hoop 312 or batter-side drum hoop 314. The resonant-side tension hoop 318 and resonant-side drum hoop 316 are similarly isolated. The batter-side drum hoop 312 and the resonant-side drum hoop 316 may each be independently adjusted against their respective tension hoops 314/318.

These embodiments should not be construed as limiting.

The invention claimed is:

1. A drum comprising:

a cylindrical shell having an interior surface and an exterior surface, and an open top and an open bottom; and at least a first interlock engaged with said shell, and protruding from said shell exterior surface proximal to said open top, and a first gasket engaged with said at least first interlock; and a first tension hoop surrounding said cylindrical shell proximal to said open top, and engaged with said at least first gasket, and further engaged with a plurality of bolts that are further engaged with a first drum hoop that is engaged with a first drum head; wherein said plurality of bolts tighten against said first tension hoop to draw said first drum hoop toward said tension hoop and to stretch said first drum head against said shell, providing a batter-side drum head.

2. The drum of claim 1 further comprising:

an annular gap between said first tension hoop and said shell; wherein said first tension hoop is vibrationally isolated from said shell such that relative motion from shell resonance can occur.

3. The drum of claim 1 further comprising:

an annular gap in said at least first gasket, wherein said annular gap separates the tension hoop and drum hoop from vibrations in the drum shell.

4. The drum of claim 1 further comprising:

an annular gap between said first drum hoop and said shell, wherein said first drum hoop is vibrationally isolated from said shell.

5. The drum of claim 1 wherein:

said first tension hoop is a mounting structure configured to support at least one peripheral support structure.

6. The drum of claim 1 further comprising:

at a second interlock engaged with said shell and protruding from said shell exterior surface proximal to said shell open bottom, and at least a second gasket engaged with said interlock; and a second tension hoop surrounding said cylindrical shell proximal to said open bottom and engaged with said at least a second gasket and further engaged with a plurality of bolts that are further engaged with a second drum hoop that is engaged with a second drum head; wherein said plurality of bolts tighten against said second tension hoop to draw said second drum hoop toward said second tension hoop and to stretch said second drum head against said shell providing a resonant-side drum head and wherein said batter-side drum head and said resonant-side drum head are independently tensionable.

7. The drum of claim 6 further comprising an annular gap between said second tension hoop and said shell; wherein said second tension hoop is vibrationally isolated from said shell.

8. The drum of claim 6 further comprising an annular gap between said second drum hoop and said shell; wherein said second drum hoop is vibrationally isolated from said shell.

9. The drum of claim 6 wherein said second tension hoop is a mounting structure configured to support at least one drum-support structure.

10. A drum comprising: a cylindrical shell having an interior surface and an exterior surface and an open top and an open bottom; and at least a first interlock having an interior component engaged with said shell interior surface and an exterior component engaged with said shell exterior surface and a fastener passing through said interior component and fastened to said exterior component and at least a first gasket engaged with said exterior component; and a first tension hoop surrounding said cylindrical shell proximal to said open top and engaged with said at least a first gasket and further engaged with a plurality of bolts that are further engaged with a first drum hoop that is engaged with a first drum head; wherein said plurality of bolts tighten against said first tension hoop to draw said first drum hoop toward said tension hoop and to stretch said first drum head against said shell providing a batter-side drum head.

11. The drum of claim 10 further comprising: an annular gap between said first tension hoop and said shell; wherein said first tension hoop is vibrationally isolated from said shell.

12. The drum of claim 10 further comprising an annular gap between said first drum hoop and said shell; wherein said first drum hoop is vibrationally isolated from said shell.

13. The drum of claim 10 wherein said first tension hoop is a mounting structure configured to support at least one drum support structure.

14. The drum of claim 10 further comprising:

at least a second interlock having an interior component engaged with said shell interior surface and an exterior component engaged with said shell exterior surface and a fastener passing through said interior component and fastened to said exterior component and a second gasket engaged with said exterior component; and a second tension hoop surrounding said cylindrical shell proximal to said open bottom and engaged with said second gasket and further engaged with a plurality of bolts that are further engaged with a second drum hoop that is engaged with a second drum head; wherein said plurality of bolts tighten against said second tension hoop to draw said second drum hoop toward said second tension hoop and to stretch said second drum head against said shell providing a resonant-side drum head and wherein said batter-side drum head and said resonant-side drum head are independently tensionable.

15. The drum of claim 14 further comprising an annular gap between said second tension hoop and said shell; wherein said second tension hoop is vibrationally isolated from said shell.

16. The drum of claim 14 further comprising an annular gap between said second drum hoop and said shell; wherein said second drum hoop is vibrationally isolated from said shell.

17. The drum of claim 14 wherein said second tension hoop is a mounting structure configured to support at least one drum support structure.

* * * * *